United States Patent
Katsura et al.

(10) Patent No.: US 11,841,681 B2
(45) Date of Patent: Dec. 12, 2023

(54) TONER

(71) Applicant: CANON KABUSHIKI KAISHA, Tokyo (JP)

(72) Inventors: Taiji Katsura, Shizuoka (JP); Hidekazu Fumita, Shizuoka (JP); Kentaro Yamawaki, Shizuoka (JP); Sara Yoshida, Shizuoka (JP); Yusuke Kosaki, Shizuoka (JP); Takayoshi Ootsuka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 17/348,053

(22) Filed: Jun. 15, 2021

(65) Prior Publication Data
US 2021/0397110 A1 Dec. 23, 2021

(30) Foreign Application Priority Data
Jun. 22, 2020 (JP) .................. 2020-107074

(51) Int. Cl.
*G03G 9/097* (2006.01)
*C08G 77/00* (2006.01)
*G03G 9/08* (2006.01)
*B82Y 40/00* (2011.01)

(52) U.S. Cl.
CPC ......... *G03G 9/09716* (2013.01); *C08G 77/70* (2013.01); *G03G 9/0819* (2013.01); *G03G 9/0823* (2013.01); *B82Y 40/00* (2013.01); *C08G 2150/20* (2013.01)

(58) Field of Classification Search
CPC ............. G03G 9/09716; G03G 9/0819; G03G 9/0823
See application file for complete search history.

(56) References Cited

U.S. PATENT DOCUMENTS

| | | |
|---|---|---|
| 4,952,476 A | 8/1990 | Sakashita et al. |
| 4,957,840 A | 9/1990 | Sakashita et al. |
| 4,985,327 A | 1/1991 | Sakashita et al. |
| 5,014,089 A | 5/1991 | Sakashita et al. |
| 5,202,213 A | 4/1993 | Nakahara et al. |
| 5,532,101 A | 7/1996 | Nozawa et al. |
| 5,534,982 A | 7/1996 | Sakaizawa et al. |
| 5,607,806 A * | 3/1997 | Kanbayashi ....... G03G 9/09716 430/108.3 |
| 5,731,122 A | 3/1998 | Yoshida et al. |
| 5,774,771 A | 6/1998 | Kukimoto et al. |
| 5,915,150 A | 6/1999 | Kukimoto et al. |
| 5,948,584 A | 9/1999 | Hashimoto et al. |
| 5,998,080 A | 12/1999 | Ohno et al. |
| 6,177,223 B1 | 1/2001 | Hashimoto et al. |
| 6,214,509 B1 | 4/2001 | Kasuya et al. |
| 6,300,024 B1 | 10/2001 | Yusa et al. |
| 6,337,169 B1 | 1/2002 | Hashimoto et al. |
| 6,528,224 B2 | 3/2003 | Ohno et al. |
| 6,627,374 B2 | 9/2003 | Fumita et al. |
| 6,696,211 B2 | 2/2004 | Yoshida et al. |
| 6,806,016 B2 | 10/2004 | Ohno et al. |
| 6,835,521 B2 | 12/2004 | Tsuji et al. |
| 6,951,704 B2 | 10/2005 | Tsuji et al. |
| 7,611,816 B2 | 11/2009 | Tuji et al. |
| 8,545,133 B2 | 10/2013 | Fumita et al. |
| 8,916,319 B2 | 12/2014 | Ikeda et al. |
| 8,940,467 B2 | 1/2015 | Hashimoto et al. |
| 9,309,349 B2 | 4/2016 | Watanabe et al. |
| 9,341,967 B2 | 5/2016 | Tsujino et al. |
| 9,366,981 B2 | 6/2016 | Yamawaki et al. |
| 9,429,860 B2 | 8/2016 | Kinumatsu et al. |
| 9,632,441 B2 | 4/2017 | Abe et al. |
| 9,658,554 B2 | 5/2017 | Kinumatsu et al. |
| 9,720,340 B2 | 8/2017 | Tominaga et al. |
| 9,733,583 B2 | 8/2017 | Kuroki et al. |
| 9,798,256 B2 | 10/2017 | Kosaki et al. |
| 9,798,262 B2 | 10/2017 | Toyoizumi et al. |
| 9,811,016 B2 | 11/2017 | Aoki et al. |
| 9,823,595 B2 | 11/2017 | Toyoizumi et al. |
| 9,857,713 B2 | 1/2018 | Kosaki et al. |
| 9,869,943 B2 | 1/2018 | Aoki et al. |
| 9,897,933 B2 | 2/2018 | Yoshida et al. |
| 10,054,866 B2 | 8/2018 | Tanaka et al. |
| 10,114,303 B2 | 10/2018 | Katsura et al. |
| 10,295,920 B2 | 5/2019 | Nishikawa et al. |
| 10,303,074 B2 | 5/2019 | Yamawaki et al. |
| 10,303,075 B2 | 5/2019 | Tanaka et al. |
| 10,409,180 B2 | 9/2019 | Koji et al. |
| 10,429,757 B2 | 10/2019 | Yoshida et al. |
| 10,503,090 B2 | 12/2019 | Tominaga et al. |
| 10,539,893 B2 | 1/2020 | Tanaka et al. |
| 10,539,899 B2 | 1/2020 | Nakamura et al. |
| 10,545,422 B2 | 1/2020 | Yamawaki et al. |
| 10,635,010 B2 | 4/2020 | Kamikura et al. |
| 10,635,011 B2 | 4/2020 | Umeda et al. |
| 10,809,639 B2 | 10/2020 | Yamawaki et al. |

(Continued)

FOREIGN PATENT DOCUMENTS

| | | |
|---|---|---|
| EP | 0 905 568 A1 | 3/1999 |
| EP | 0 953 884 A2 | 11/1999 |
| JP | 9-160288 A | 6/1997 |
| JP | H10-326028 A | 12/1998 |
| JP | 2006-201562 A | 8/2006 |
| JP | 2016-163866 A | 9/2016 |

*Primary Examiner* — Peter L Vajda
*Assistant Examiner* — Boone Alexander Evans
(74) *Attorney, Agent, or Firm* — VENABLE LLP

(57) ABSTRACT

A toner comprising a toner particle and an external additive, wherein the external additive comprises a composite particle comprising an organosilicon polymer fine particle covering a surface of an alumina particle, a coverage ratio of the surface of the alumina particle with the organosilicon polymer fine particle is 1 to 50 area %, and given A (nm) as a number-average particle diameter of primary particles of the organosilicon polymer fine particle and B (nm) as a number-average particle diameter of primary particles of the alumina particle, following formulae (I) and (II) are satisfied:

$$A \leq 90 \qquad (I)$$

$$100 \leq B \leq 1000 \qquad (II).$$

7 Claims, No Drawings

(56) References Cited

U.S. PATENT DOCUMENTS

| | | |
|---|---|---|
| 10,942,465 B2 | 3/2021 | Kototani et al. |
| 10,942,466 B2 | 3/2021 | Tominaga et al. |
| 10,976,678 B2 | 4/2021 | Yamawaki et al. |
| 10,976,679 B2 | 4/2021 | Tanaka et al. |
| 11,003,104 B2 | 5/2021 | Katsura et al. |
| 11,003,105 B2 | 5/2021 | Sato et al. |
| 2001/0018158 A1 | 8/2001 | Yoshida et al. |
| 2015/0248072 A1 | 9/2015 | Katsuta et al. |
| 2018/0329324 A1* | 11/2018 | Kamikura ............ G03G 9/0825 |
| 2018/0329325 A1 | 11/2018 | Hatakeyama |
| 2020/0209776 A1 | 7/2020 | Kototani et al. |
| 2020/0292955 A1 | 9/2020 | Matsunaga et al. |
| 2021/0003932 A1 | 1/2021 | Tsuda et al. |
| 2021/0003934 A1 | 1/2021 | Fumita et al. |

* cited by examiner

TONER

BACKGROUND OF THE INVENTION

Field of the Invention

The present disclosure relates to a toner for use in image-forming methods such as electrophotographic methods.

Description of the Related Art

Higher speeds, longer device lives, and greater energy efficiency and compactness are being required from electrophotographic image-forming apparatuses, and meeting these requirements necessitates further improvements in various kinds of performance. In particular, improvements in the quality stability of the toner are needed to extend device lives. Not only do the properties of the toner itself need to be stable, but it is also important to prevent wear and contamination of various key parts such as photosensitive members, toner transport members and charging members. From this perspective, various toners and external additives have been proposed.

Japanese Patent Application Publication No. H10-326028 proposes a toner whereby various image properties such as image density and background fogging are maintained and damage to the photosensitive members is reduced by using an alumina particle exhibiting a specific relationship between BET specific surface area and tap density. Japanese Patent Application Publication No. 2006-201562 proposes a toner whereby detachment of alumina particles from the toner particle is prevented and member wear is reduced while maintaining stable image quality by stipulating a circularity and sharp particle size distribution for the toner particle and providing a work function difference between the toner particle and the alumina particle. Japanese Patent Application Publication No. 2016-163866 proposes a composite particle with excellent mixing uniformity achieved by using a composite particle including an organic particle and an inorganic fine particle partially linked to one another via an organic hydrophobizing agent.

SUMMARY OF THE INVENTION

However, when the toner of Japanese Patent Application Publication No. H10-326028 and the toner of Japanese Patent Application Publication No. 2006-201562 were evaluated in image-forming apparatuses supporting higher speeds and longer device lives, it was found that the image properties at the end of long-term use suffered from problems such reduced solid image followability accompanying reduced toner flowability, fogging accompanying deterioration of the charging characteristics, and contamination of the charging member. In the case of the composite particle described in Japanese Patent Application Publication No. 2016-163866, the composite particle is obtained by attaching an inorganic fine particle with a small particle diameter to a relatively large submicron-sized organic fine particle. When such a composite particle moves from the toner to the key parts, it tends to cause wear or contamination of the key parts.

That is, it has been found that when using the toners described in these documents of prior art, there are still problems in terms of the required properties. The present disclosure provides a toner having excellent flowability and charging stability during long-term durable use with little wear or contamination of the key parts of the image-forming apparatus.

The inventors discovered as a result of diligent study that the above problems can be solved with the following toner.

That is, the present disclosure relates to a toner comprising a toner particle and an external additive, wherein
the external additive comprises a composite particle comprising an organosilicon polymer fine particle covering a surface of an alumina particle,
a coverage ratio of the surface of the alumina particle with the organosilicon polymer fine particle is from 1 to 50 area %, and
given A (nm) as a number-average particle diameter of primary particles of the organosilicon polymer fine particle and B (nm) as a number-average particle diameter of primary particles of the alumina particle, following formulae (I) and (II) are satisfied:

$$A \leq 90 \quad \text{(I)}$$

$$100 \leq B \leq 1000 \quad \text{(II)}.$$

The present disclosure can provide a toner having excellent flowability and charging stability during long-term durable use with little wear or contamination of the key parts of the image-forming apparatus. Further features of the present invention will become apparent from the following description of exemplary embodiments.

DESCRIPTION OF THE EMBODIMENTS

This toner comprises as an external additive a composite particle comprising an organosilicon polymer fine particle covering the surface of an alumina particle. Conventionally, submicron-size alumina particles are known to improve the toner charging performance of toner when used as external additives. This tendency is especially evident in non-magnetic one-component developing systems. This has been attributed to a microcarrier effect that confers chargeability on the toner particle when the alumina particle is charged to a reverse polarity from the toner particle. On the other hand, alumina particles are very hard and tend to cause wear of the various key parts such as the photosensitive member. In non-magnetic one-component developing systems, moreover, adhesion of alumina to key parts such as the regulating blade tends to cause the toner to be overcharged at the end of long-term use. Charging roller contamination and fogging tend to occur during the second half of long-term use as a result.

The inventors therefore investigated methods of controlling such problems caused by alumina particles. Specifically, the inventors tried to control these problems while maintaining the effect of the alumina particle by partially covering the alumina particle with a different material. The inventors thereby discovered that an organosilicon polymer fine particle was superior as such as material. Organosilicon polymer fine particles are known to be less hard than inorganic fine particles of alumina, silica and the like. Wear of the various key parts can be suppressed by partially covering an alumina particle with an organosilicon polymer fine particle. Because the organosilicon polymer fine particle has excellent release properties, it is possible to suppress member contamination while also maintaining good toner flowability.

From this, the inventors discovered that by using a composite particle comprising an organosilicon polymer fine particle covering the surface of an alumina particle, it was possible to obtain a toner having excellent flowability and charging stability even during long-term use with little wear or contamination of the key parts of the image-forming apparatus.

Unless otherwise specified, descriptions of numerical ranges such as "from A to B" or "A to B" represent numerical ranges that include the numbers at the upper and lower limits of the range.

Specifically, the present disclosure relates to a toner comprising a toner particle and an external additive, wherein
the external additive comprises a composite particle comprising an organosilicon polymer fine particle covering a surface of an alumina particle,
a coverage ratio of the surface of the alumina particle with the organosilicon polymer fine particle is from 1 to 50 area %, and
given A (nm) as a number-average particle diameter of primary particles of the organosilicon polymer fine particle and B (nm) as a number-average particle diameter of primary particles of the alumina particle, following formulae (I) and (II) are satisfied:

$$A \leq 90 \tag{I}$$

$$100 \leq B \leq 1000. \tag{II}$$

The toner comprises a toner particle and an external additive, and the external additive contains a composite particle comprising an organosilicon polymer fine particle covering the surface of an alumina particle. For the organosilicon polymer fine particle to cover the surface of the alumina particle means a state in which the organosilicon polymer fine particle is attached to the surface of the alumina particle. The attachment or non-attachment of the organosilicon polymer fine particle can be confirmed by observing the toner with an electron microscope or the like.

The coverage ratio of the surface of the alumina particle with the organosilicon polymer fine particle is from 1 area % to 50 area %. If the coverage ratio is less than 1 area %, the suppression effect of the organosilicon polymer fine particle on wear and contamination of the key parts is not obtained. If the coverage ratio exceeds 50 area %, on the other hand, the chargeability-conferring effect of the alumina is not sufficiently obtained because the microcarrier effect of the alumina is inhibited. By keeping the coverage ratio within the above range, it is possible to suppress the problems of wear and contamination of the members while also improving flowability and charging performance. The coverage ratio is preferably from 2 area % to 45 area %, or more preferably from 5 area % to 40 area %.

The specific method for measuring the coverage ratio is explained below. The method for controlling the coverage ratio of the composite particle within the above range is not particularly limited, but this can be achieved by selecting an alumina particle with excellent aggregation properties or by adjusting the external additive mixing conditions.

An alumina particle with excellent aggregation properties may be an alumina particle containing few fine alumina particles generated by the manufacturing method, the deagglomeration process or the like. Furthermore, alumina particles with a high degree of circularity have a tendency to aggregate easily on the toner particle surface in the external addition step, while alumina particles having nearly spherical polyhedral structures are excellent at forming the most stable aggregates.

Methods for manufacturing highly circular alumina particles include explosion combustion methods for obtaining alumina particles by combusting and mixing aluminum in an oxidizing flow, and methods for obtaining particles by synthesizing and firing aluminum dawsonite.

Methods for manufacturing alumina particles having nearly spherical polyhedral structures include chemical vapor deposition methods in which an alumina hydrate raw material is fired in a special gas atmosphere to grow single-crystal particles in situ.

The method for forming the composite particle is not particularly limited. For example, in a two-stage external addition method the alumina particle is mixed in advance with the toner particle to perform external addition and form aggregate particles of the alumina particle, after which the organosilicon polymer fine particle is added and mixed to perform external addition. Composite particles of the organosilicon polymer fine particle and the alumina particle can thus be formed by electrostatic attraction.

Alternatively, the alumina particle and the organosilicon polymer fine particle may be mixed in advance to form composite particles of the alumina particle and the organosilicon polymer fine particle, after which the resulting composite particle is externally added to the toner particle.

Composite particles may also be formed by combining other methods such as reducing the motive force during external addition and mixing to promote aggregation of the alumina particle or shortening the treatment time to maintain the aggregate particles.

Given A (nm) as the number-average particle diameter of the primary particles of the organosilicon polymer fine particle and B (nm) as the number-average particle diameter of the primary particles of the alumina particle, the following formulae (I) and (II) are satisfied:

$$A \leq 90 \tag{I}$$

$$100 \leq B \leq 1000 \tag{II}$$

The number-average particle diameter A (nm) of the primary particles of the organosilicon polymer fine particle must be not more than 90. If the number-average particle diameter of the primary particles of the organosilicon polymer fine particle is within this range, it is easier to form composite particles with the alumina particle as discussed below, and easier to control the coverage ratio within the specified range. If A (nm) is greater than 90, the composite particles are likely to break up, making member contamination more likely.

The number-average particle diameter A (nm) is preferably not more than 80, or still more preferably not more than 60. There is no particularly lower limit, but preferably it is at least 5, or more preferably at least 15.

The number-average particle diameter A (nm) can be controlled by various wet and dry classification treatments. As discussed below, moreover, when the organosilicon polymer fine particle is prepared by a wet manufacturing method, the number-average particle diameter A can be controlled by controlling the differences in the various reaction conditions and the like during the hydrolysis and condensation reactions.

The number-average particle diameter B (nm) of the primary particles of the alumina particle must be from 100 to 1000. When the number-average particle diameter of the primary particles of the alumina particle is within this range, the microcarrier effect of the alumina particle is more easily obtained. If B (nm) is less than 100, the chargeability-conferring effect on the toner is reduced. If B (nm) exceeds 1000, toner flowability declines and member contamination occurs.

The number-average particle diameter B (nm) is preferably from 150 to 900, or more preferably from 200 to 600.

The number-average particle diameter B (nm) can be controlled by various wet and dry classification treatments, or by controlling the differences in manufacturing conditions in the various alumina manufacturing methods discussed below.

A relationship of A<B exists between the number-average particle diameters A and B.

Making the organosilicon polymer fine particle smaller than the alumina particle makes it easier to obtain a composite particle in which the organosilicon polymer fine particle covers the surface of the alumina particle. If A>B, the result is a composite particle in which the alumina particle covers the surface of the organosilicon polymer fine particle, and the above effects are not obtained.

B−A (nm) is preferably from 50 to 700, or more preferably from 300 to 650.

The average projected area of the composite particle of the alumina particle and the organosilicon polymer fine particle is preferably from 0.01 µm² to 1.00 µm², or more preferably from 0.10 µm² to 0.60 µm², or still more preferably from 0.15 µm² to 0.50 µm².

The rolling properties of the composite particle on the toner particle surface are improved if the average projected area of the composite particle of the alumina particle and the organosilicon polymer fine particle is at least 0.01 µm², and a more durable chargeability-conferring effect can be obtained.

If the average projected area is not more than 1.00 µm², detachment of the composite particle from the toner particle surface can be reduced, and member contamination can be further reduced.

The composition of the organosilicon polymer fine particle is not particularly limited, but a fine particle of the following composition is preferred.

This organosilicon polymer fine particle has a structure of alternately binding silicon atoms and oxygen atoms, and at least part of the organosilicon polymer in the organosilicon polymer fine particle has a T3 unit structure represented by $R^aSiO_{3/2}$. $R^a$ is preferably a hydrocarbon group, and more preferably a $C_{1-6}$ (preferably $C_{1-3}$, or more preferably $C_{1-2}$) alkyl group or a phenyl group.

In $^{29}$Si-NMR measurement of the organosilicon polymer fine particle, moreover, a ratio of an area of a peak derived from silicon having the T3 unit structure relative to a total area of peaks derived from all silicon elements contained in the organosilicon polymer fine particle is preferably from 0.50 to 1.00, or more preferably from 0.90 to 1.00, or still more preferably from 0.97 to 1.00.

The method of manufacturing the organosilicon polymer fine particle is not particularly limited, and for example it can be obtained by dripping a silane compound into water, hydrolyzing it with a catalyst and performing a condensation reaction, after which the resulting suspension is filtered and dried. The particle diameter can be controlled by means of the type and compounding ratio of the catalyst, the reaction initiation temperature, and the dripping time and the like.

Examples of the catalyst include, but are not limited to, acidic catalysts such as hydrochloric acid, hydrofluoric acid, sulfuric acid, nitric acid and the like, and basic catalysts such as ammonia water, sodium hydroxide, potassium hydroxide and the like.

The organosilicon compound for producing the organosilicon polymer fine particle is explained below.

The organosilicon polymer is preferably a polycondensate of an organosilicon compound having a structure represented by the following formula (Z):

In formula (Z), $R^a$ represents an organic functional group, and each of $R^1$, $R^2$ and $R^3$ independently represents a halogen atom, hydroxyl group or acetoxy group, or a (preferably $C_{1-3}$) alkoxy group.

$R^a$ is an organic functional group without any particular limitations, but preferred examples include $C_{1-6}$ (preferably $C_{1-3}$, more preferably $C_{1-2}$) hydrocarbon groups (preferably alkyl groups) and aryl (preferably phenyl) groups.

Each of $R^1$, $R^2$ and $R^3$ independently represents a halogen atom, hydroxyl group, acetoxy group or alkoxy group. These are reactive groups that form crosslinked structures by hydrolysis, addition polymerization and condensation. Hydrolysis, addition polymerization and condensation of $R_1$, $R^2$ and $R^3$ can be controlled by means of the reaction temperature, reaction time, reaction solvent and pH. An organosilicon compound having three reactive groups ($R^1$, $R^2$ and $R^3$) in the molecule apart from $R^a$ as in formula (Z) is also called a trifunctional silane. The carbon number of the alkoxy group is preferably 1 to 3, or more preferably 1 or 2.

Examples of formula (Z) include the following:

trifunctional methylsilanes such as p-styryl trimethoxysilane, methyl trimethoxysilane, methyl triethoxysilane, methyl diethoxymethoxysilane, methyl ethoxydimethoxysilane, methyl trichlorosilane, methyl methoxydichlorosilane, methyl ethoxydichlorosilane, methyl dimethoxychlorosilane, methyl methoxyethoxychlorosilane, methyl diethoxychlorosilane, methyl triacetoxysilane, methyl diacetoxymethoxysilane, methyl diacetoxyethoxysilane, methyl acetoxydimethoxysilane, methyl acetoxymethoxyethoxysilane, methyl acetoxydiethoxysilane, methyl trihydroxysilane, methyl methoxydihydroxysilane, methyl ethoxydihydroxysilane, methyl dimethoxyhydroxysilane, methyl ethoxymethoxyhydroxysilane and methyl diethoxyhydroxysilane; trifunctional ethylsilanes such as ethyl trimethoxysilane, ethyl triethoxysilane, ethyl trichlorosilane, ethyl triacetoxysilane and ethyl trihydroxysilane; trifunctional propylsilanes such as propyl trimethoxysilane, propyl triethoxysilane, propyl trichlorosilane, propyl triacetoxysilane and propyl trihydroxysilane; trifunctional butylsilanes such as butyl trimethoxysilane, butyl triethoxysilane, butyl trichlorosilane, butyl triacetoxysilane and butyl trihydroxysilane; trifunctional hexylsilanes such as hexyl trimethoxysilane, hexyl triethoxysilane, hexyl trichlorosilane, hexyl triacetoxysilane and hexyl trihydroxysilane; and trifunctional phenylsilanes such as phenyl trimethoxysilane, phenyl triethoxysilane, phenyl trichlorosilane, phenyl triacetoxysilane and phenyl trihydroxysilane. These organosilicon compounds may be used individually, or two or more kinds may be combined.

The following may also be used in combination with the organosilicon compound having the structure represented by formula (Z): organosilicon compounds having four reactive groups in the molecule (tetrafunctional silanes), organosilicon compounds having two reactive groups in the molecule (bifunctional silanes), and organosilicon compounds having one reactive group in the molecule (monofunctional silanes). Examples include:

dimethyl diethoxysilane, tetraethoxysilane, hexamethyl disilazane, 3-aminopropyl trimethoxysilane, 3-aminopropyl triethoxysilane, 3-(2-aminoethyl)aminopropyl trimethoxysilane, 3-(2-aminoethyl)aminopropyl triethoxysilane, and trifunctional vinyl silanes such as vinyl triisocyanatosilane, vinyl trimethoxysilane, vinyl triethoxysilane, vinyl diethoxymethoxysilane, vinyl ethoxydimethoxysilane, vinyl ethoxydihydroxysilane, vinyl dimethoxyhydroxysilane, vinyl ethoxymethoxyhydroxysilane and vinyl diethoxyhydroxysilane.

The content of the structure represented by formula (Z) in the monomers forming the organosilicon polymer is preferably at least 50 mol %, or more preferably at least 60 mol %.

The alumina particle is not particularly limited as long as it can form a composite particle with the organosilicon polymer fine particle explained above. The alumina manufacturing method may be an ammonium aluminum carbonate pyrolysis method, an aluminum alum pyrolysis method, an underwater spark discharge method, a vapor-phase oxidation method, an explosion method, a Bayer method, an aluminum alkoxide hydrolysis method or the like. The alumina is manufactured for example using transition alumina or an alumina raw material that is converted to transition alumina by heat treatment.

Of the forms of alumina having polymorphisms represented by $Al_2$—$O_3$, transition alumina means all alumina other than alpha alumina. Specific examples include γ-alumina, δ-alumina, θ-alumina and the like.

The desired alpha alumina in powdered form is obtained via a firing process using the alumina raw material for obtaining transition alumina. An alumina particle manufactured by chemical vapor deposition that promotes crystal growth by application of heat in a special gas atmosphere during firing has a polyhedral shape and a uniform particle size distribution with few fine particles and is especially suited to forming a composite particle.

The circularity of the alumina particle is preferably from 0.70 to 0.99, or more preferably from 0.75 to 0.85.

If the circularity is at least 0.70, the aggregation properties of the alumina particles with each other are improved, and it is easier to form composite particles with the organosilicon polymer fine particle. The rolling properties of the composite particle are also good, and a suitable microcarrier function can be obtained.

If the circularity is not more than 0.99, the composite particle is resistant to breakage caused by repeated mechanical stress in the developing device, and the microcarrier function can be obtained stably over a long period of time, resulting in excellent durability.

Functions can also be imparted by surface treating the alumina particle to modify the surface properties and hydrophobicity. However, because it is desirable from the standpoint of conferring chargeability that the alumina particle be strongly positive, the alumina particle surface is preferably untreated, or in other words the alumina particle is preferably not treated with a hydrophobizing agent or the like.

When surface treatment is performed, it is preferably with a hydrophobic oil, a coupling agent or a hydrophobic resin. Of these, a silicone oil, a coupling agent or an organic acid resin or the like is used by preference. Examples of oils that can be used include silicone oils such as dimethyl polysiloxane and methyl hydrogene polysiloxane, and paraffin, mineral oil and the like.

The amount used for treatment is preferably from 1 to 50 mass parts per 100 mass parts of the alumina particle. Mass parts from 3 to 40 are preferred for achieving uniform treatment without causing particle fusion.

The method for surface treating the alumina particle with these hydrophobic treatment agents may be a known method. Examples include known methods such as methods of spraying the treatment agent onto the alumina particle in a flowing state, and methods of dripping droplets onto the alumina particle as the particle is mechanically stirred. Heating treatment may also be performed after surface treatment to promote a reaction or remove the solvent.

There are no particular limitations to the method of adding the composite particle comprising an organosilicon polymer fine particle covering the surface of an alumina particle to the toner particle as an external additive. As discussed above, after the composite particle is formed it may be externally added and mixed with the toner particle, or the composite particle may be formed on the toner particle.

The mixer for pre-mixing may be for example an FM mixer (Nippon Coke & Engineering Co., Ltd.), super mixer (Kawata Mfg. Co., Ltd.), Nobilta (Hosokawa Micron Corporation), hybridizer (Nara Machinery Co., Ltd.) or the like. In addition to the composite particle, the organosilicon polymer fine particle and alumina particle may also each be present independently on the toner particle.

The number ratio of the composite particle relative to the toner particle (number of composite particles per 1 toner particle) is not particularly limited, but is preferably at least 0.1, or more preferably at least 1. From the standpoint of toner flowability the number ratio is preferably not more than 50, or more preferably not more than 20, or still more preferably not more than 15. These numerical ranges may be combined arbitrarily.

The content of the composite particle is not particularly limited, but is preferably from 0.01 to 3.00 mass parts, or more preferably from 0.10 to 1.00 mass parts per 100 mass parts of the toner particle.

Another external additive may also be included in the toner to improve the toner performance. For example, silica is desirable. In this case, inorganic and organic fine particles including the composite particles are preferably contained in the amount of from 0.50 to 5.00 mass parts per 100 mass parts of the toner particle.

If the total amount of fine particles is within this range, toner fluidity is further improved, and contamination of the members by external additives can be further suppressed. Examples of these inorganic and organic fine particles include known particles used in toners.

The mixer for adding the external additives to the toner particle is not particularly limited, and a known dry or wet mixer may be used. Examples include the FM mixer (Nippon Coke & Engineering Co., Ltd.), super mixer (Kawata Mfg. Co., Ltd.), Nobilta (Hosokawa Micron Corporation), hybridizer (Nara Machinery Co., Ltd.) and the like.

The sieving apparatus used to separate out coarse particles after external addition may be an Ultrasonic (Koei Sangyo Co., Ltd.); Resona Sieve or Gyro-Sifter (Tokuju Co., Ltd.); Vibrasonic System (Dalton Corporation); Soniclean (Sintokogio, Ltd.); Turbo Screener (Freund-Turbo Corporation); Microsifter (Makino Mfg. Co., Ltd.) or the like.

The method for manufacturing the toner particle is explained here.

A known method may be used as the toner particle manufacturing method, such as a kneading pulverization method or wet manufacturing method. A wet manufacturing method is preferred from the standpoint of shape control and obtaining a uniform particle diameter. Examples of wet manufacturing methods include suspension polymerization methods, solution suspension methods, emulsion polymerization-aggregation methods, emulsion aggregation methods and the like, and an emulsion aggregation method is preferred.

In emulsion aggregation methods, materials such as a binder resin fine particle, a colorant fine particle and the like are dispersed and mixed in an aqueous medium containing a dispersion stabilizer. A surfactant may also be added to the aqueous medium. A flocculant is then added to aggregate the mixture until the desired toner particle size is reached, and the resin fine particles are also fused together either after or during aggregation. Shape control with heat may also be performed as necessary in this method to form a toner particle.

The binder resin fine particle here may be a composite particle formed as a multilayer particle comprising two or more layers composed of resins with different compositions. This can be manufactured for example by an emulsion polymerization method, mini-emulsion polymerization method, phase inversion emulsion method or the like, or by a combination of multiple manufacturing methods.

When the toner particle contains an internal additive such as a colorant, the internal additive may be included originally in the resin fine particle, or a liquid dispersion of an internal additive fine particle consisting only of the internal additive may be prepared separately, and the internal additive fine particles may then be aggregated together when the resin fine particles are aggregated.

Resin fine particles with different compositions may also be added at different times during aggregation, and aggregated to prepare a toner particle composed of layers with different compositions.

The following may be used as the dispersion stabilizer:
inorganic dispersion stabilizers such as tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina.

Other examples include organic dispersion stabilizers such as polyvinyl alcohol, gelatin, methyl cellulose, methyl hydroxypropyl cellulose, ethyl cellulose, carboxymethyl cellulose sodium salt, and starch.

A known cationic surfactant, anionic surfactant or nonionic surfactant may be used as the surfactant.

Specific examples of cationic surfactants include dodecyl ammonium bromide, dodecyl trimethylammonium bromide, dodecylpyridinium chloride, dodecylpyridinium bromide, hexadecyltrimethyl ammonium bromide and the like.

Specific examples of nonionic surfactants include dodecylpolyoxyethylene ether, hexadecylpolyoxyethylene ether, nonylphenylpolyoxyethylene ether, lauryl polyoxyethylene ether, sorbitan monooleate polyoxyethylene ether, styrylphenyl polyoxyethylene ether, monodecanoyl sucrose and the like.

Specific examples of anionic surfactants include aliphatic soaps such as sodium stearate and sodium laurate, and sodium lauryl sulfate, sodium dodecylbenzene sulfonate, sodium polyoxyethylene (2) lauryl ether sulfate and the like.

The binder resin constituting the toner is explained next.

Preferred examples of the binder resin include vinyl resins, polyester resins and the like. Examples of vinyl resins, polyester resins and other binder resins include the following resins and polymers:

monopolymers of styrenes and substituted styrenes, such as polystyrene and polyvinyl toluene; styrene copolymers such as styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer and styrene-maleic acid ester copolymer; and polymethyl methacryalte, polybutyl methacrylate, polvinyl acetate, polyethylene, polypropylene, polvinyl butyral, silicone resin, polyamide resin, epoxy resin, polyacrylic resin, rosin, modified rosin, terpene resin, phenol resin, aliphatic or alicyclic hydrocarbon resins and aromatic petroleum resins. These binder resins may be used individually or mixed together.

The binder resin preferably contains carboxyl groups, and is preferably a resin manufactured using a polymerizable monomer containing a carboxyl group. Examples include vinylic carboxylic acids such as acrylic acid, methacrylic acid, α-ethylacrylic acid and crotonic acid; unsaturated dicarboxylic acids such as fumaric acid, maleic acid, citraconic acid and itaconic acid; and unsaturated dicarboxylic acid monoester derivatives such as monoacryloyloxyethyl succinate ester, monomethacryloyloxyethyl succinate ester, monoacryloyloxyethyl phthalate ester and monomethacryloyloxyethyl phthalate ester.

Polycondensates of the carboxylic acid components and alcohol components listed below may be used as the polyester resin. Examples of carboxylic acid components include terephthalic acid, isophthalic acid, phthalic acid, fumaric acid, maleic acid, cyclohexanedicarboxylic acid and trimellitic acid. Examples of alcohol components include bisphenol A, hydrogenated bisphenols, bisphenol A ethylene oxide adduct, bisphenol A propylene oxide adduct, glycerin, trimethyloyl propane and pentaerythritol.

The polyester resin may also be a polyester resin containing a urea group. Preferably the terminal and other carboxyl groups of the polyester resins are not capped.

To control the molecular weight of the binder resin constituting the toner particle, a crosslinking agent may also be added during polymerization of the polymerizable monomers.

Examples include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis (4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and these with methacrylate substituted for the acrylate.

The added amount of the crosslinking agent is preferably from 0.001 to 15.000 mass parts per 100 mass parts of the polymerizable monomers.

A release agent is preferably included as one of the materials constituting the toner. In particular, a plasticization effect is easily obtained using an ester wax with a melting point of from 60° C. to 90° C. because the wax is highly compatible with the binder resin.

Examples of the ester wax include waxes having fatty acid esters as principal components, such as carnauba wax and montanic acid ester wax; those obtained by deoxidizing part or all of the oxygen component from the fatty acid ester, such as deoxidized carnauba wax; hydroxyl group-containing methyl ester compounds obtained by hydrogenation or the like of vegetable oils and fats; saturated fatty acid monoesters such as stearyl stearate and behenyl behenate; diesterified products of saturated aliphatic dicarboxylic acids and saturated fatty alcohols, such as dibehenyl sebacate, distearyl dodecanedioate and distearyl octadecanedioate; and diesterified products of saturated aliphatic diols and saturated aliphatic monocarboxylic acids, such as nonanediol dibehenate and dodecanediol distearate.

Of these waxes, it is desirable to include a bifunctional ester wax (diester) having two ester bonds in the molecular structure.

A bifunctional ester wax is an ester compound of a dihydric alcohol and an aliphatic monocarboxylic acid, or an ester compound of a divalent carboxylic acid and a fatty monoalcohol.

Specific examples of the aliphatic monocarboxylic acid include myristic acid, palmitic acid, stearic acid, arachidic acid, behenic acid, lignoceric acid, cerotic acid, montanic acid, melissic acid, oleic acid, vaccenic acid, linoleic acid and linolenic acid.

Specific examples of the fatty monoalcohol include myristyl alcohol, cetanol, stearyl alcohol, arachidyl alcohol, behenyl alcohol, tetracosanol, hexacosanol, octacosanol and triacontanol.

Specific examples of the divalent carboxylic acid include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecaendioic acid, tetradecanedioic acid, hexadecanedioic acid, octadecanedioic acid, eicosanedioic acid, phthalic acid, isophthalic acid, terephthalic acid and the like.

Specific examples of the dihydric alcohol include ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexane dimethanol, spiroglycol, 1,4-phenylene glycol, bisphenol A, hydrogenated bisphenol A and the like.

Other release agents that can be used include petroleum waxes such as paraffin wax, microcrystalline wax and petrolatum, and their derivatives; montanic wax and its derivatives, hydrocarbon waxes obtained by the Fischer-Tropsch method and their derivatives, polyolefin waxes such as polyethylene and polypropylene and their derivatives, natural waxes such as carnauba wax and candelilla wax and their derivatives, higher fatty alcohols, and fatty acids such as stearic acid and palmitic acid, or these compounds.

The content of the release agent is preferably from 5.0 to 20.0 mass parts per 100.0 mass parts of the binder resin or polymerizable monomers.

A colorant may also be included in the toner. The colorant is not specifically limited, and the following known colorants may be used.

Examples of yellow pigments include yellow iron oxide, Naples yellow, naphthol yellow S, Hansa yellow G, Hansa yellow 10G, benzidine yellow G, benzidine yellow GR, quinoline yellow lake, permanent yellow NCG, condensed azo compounds such as tartrazine lake, isoindolinone compounds, anthraquinone compounds, azo metal complexes, methine compounds and allylamide compounds. Specific examples include:

C.I. pigment yellow 12, 13, 14, 15, 17, 62, 74, 83, 93, 94, 95, 109, 110, 111, 128, 129, 147, 155, 168 and 180.

Examples of red pigments include red iron oxide, permanent red 4R, lithol red, pyrazolone red, watching red calcium salt, lake red C, lake red D, brilliant carmine 6B, brilliant carmine 3B, eosin lake, rhodamine lake B, condensed azo compounds such as alizarin lake, diketopyrrolopyrrole compounds, anthraquinone compounds, quinacridone compounds, basic dye lake compounds, naphthol compounds, benzimidazolone compounds, thioindigo compound and perylene compounds. Specific examples include:

C.I. pigment red 2, 3, 5, 6, 7, 23, 48:2, 48:3, 48:4, 57:1, 81:1, 122, 144, 146, 166, 169, 177, 184, 185, 202, 206, 220, 221 and 254.

Examples of blue pigments include alkali blue lake, Victoria blue lake, phthalocyanine blue, metal-free phthalocyanine blue, phthalocyanine blue partial chloride, fast sky blue, copper phthalocyanine compounds such as indathrene blue BG and derivatives thereof, anthraquinone compounds and basic dye lake compounds. Specific examples include:

C.I. pigment blue 1, 7, 15, 15:1, 15:2, 15:3, 15:4, 60, 62 and 66.

Examples of black pigments include carbon black and aniline black. These colorants may be used individually, or as a mixture, or in a solid solution.

The content of the colorant is preferably from 3.0 mass parts to 15.0 mass parts per 100.0 mass parts of the binder resin.

The toner particle may also contain a charge control agent. A known charge control agent may be used. A charge control agent that provides a rapid charging speed and can stably maintain a uniform charge quantity is especially desirable.

Examples of charge control agents for controlling the negative charge properties of the toner particle include:

organic metal compounds and chelate compounds, including monoazo metal compounds, acetylacetone metal compounds, aromatic oxycarboxylic acids, aromatic dicarboxylic acids, and metal compounds of oxycarboxylic acids and dicarboxylic acids. Other examples include aromatic oxycarboxylic acids, aromatic mono- and polycarboxylic acids and their metal salts, anhydrides and esters, and phenol derivatives such as bisphenols and the like. Further examples include urea derivatives, metal-containing salicylic acid compounds, metal-containing naphthoic acid compounds, boron compounds, quaternary ammonium salts and calixarenes.

Meanwhile, examples of charge control agents for controlling the positive charge properties of the toner particle include nigrosin and nigrosin modified with fatty acid metal salts; guanidine compounds; imidazole compounds; quaternary ammonium salts such as tributylbenzylammonium-1-hydroxy-4-naphthosulfonate salt and tetrabutylammonium tetrafluoroborate, onium salts such as phosphonium salts that are analogs of these, and lake pigments of these; triphenylmethane dyes and lake pigments thereof (using phosphotungstic acid, phosphomolybdic acid, phosphotungstenmolybdic acid, tannic acid, lauric acid, gallic acid, ferricyanic acid or a ferrocyan compound or the like as the laking agent); metal salts of higher fatty acids; and resin charge control agents.

One charge control agent alone or a combination of two or more kinds may be included. The content of the charge control agent is preferably from 0.01 to 10.00 mass parts per 100.00 mass parts of the binder resin or polymerizable monomers.

The toner may be used favorably as a toner for two-component developing or as a toner for one-component developing. Because one-component developing devices are particularly liable to member contamination and toner deterioration during long-term operation, the above effects can be more fully realized when the toner is applied to a one-component developing device adapted to higher speeds and longer device lives.

In a one-component developing system, moreover, the toner can exert a long-term microcarrier effect with both contact developing methods and contactless developing methods, and a long-lived system can thus be constructed.

The methods for measuring the various physical properties are explained below.

Method for Identifying Composite Particle Comprising Organosilicon Polymer Fine Particle Covering the Surface of Alumina Particle The composite particle comprising the organosilicon polymer fine particle covering the surface of the alumina particle can be identified by a combination of shape observation by scanning electron microscopy (SEM) and elemental analysis by energy-dispersive X-ray spectroscopy (EDS). In detail, identification may be performed by the methods described below for identifying the organosilicon polymer fine particle and the alumina particle.

Organosilicon Polymer Fine Particle Identification Method

The organosilicon polymer fine particle contained in the toner can be identified by a method combining shape observation by SEM with elemental analysis by EDS.

The toner is observed in a field enlarged to a maximum magnification of 50000× with a scanning electron microscope (trade name: "S-4800", Hitachi, Ltd.). The microscope is focused on the toner particle surface, and the external additive is observed. Each particle of the external additive is subjected to EDS analysis to determine whether or not the analyzed particle is an organosilicon polymer fine particle based on the presence or absence of an Si element peak.

When the toner contains both an organosilicon polymer fine particle and a silica fine particle, the ratio of the elemental contents (atomic %) of Si and O (Si/O ratio) is compared with that of a standard product to identify the organosilicon polymer fine particle.

Standard products of both the organosilicon polymer fine particle and silica fine particle are subjected to EDS analysis under the same conditions, to determine the elemental contents (atomic %) of Si and O.

The Si/O ratio of the organosilicon polymer fine particle is given as A, and the Si/O ratio of the silica fine particle as B. Measurement conditions are selected such that A is significantly larger than B.

Specifically, the standard products are measured 10 times under the same conditions, and arithmetic means are obtained for both A and B. The measurement conditions are selected so that the arithmetic means yield an AB ratio greater than 1.1.

If the Si/O ratio of an evaluated fine particle is closer to A than to [(A+B)/2], the fine particle is judged to be an organosilicon polymer fine particle.

Tospearl 120A (Momentive Performance Materials Japan LLC) is used as the standard product for the organosilicon polymer fine particle, and HDK V15 (Asahi Kasei Corporation) as the standard product for the organosilicon polymer fine particle.

Method for Identifying Compositions and Ratios of Constituent Compounds of Organosilicon Polymer Fine Particle The compositions and ratios of the constituent compounds of the organosilicon polymer fine particle contained in the toner are identified by NMR.

When the toner contains a silica fine particle in addition to the organosilicon polymer fine particle, 1 g of the toner is dissolved and dispersed in 31 g of chloroform in a vial. This is dispersed for 30 minutes with an ultrasound homogenizer to prepare a liquid dispersion.

Ultrasonic processing unit: VP-050 ultrasound homogenizer (Taitec Corporation) Microchip: Step microchip, tip diameter φ 2 mm Microchip tip position: Center of glass vial and 5 mm above bottom of vial Ultrasound conditions: Intensity 30%, 30 minutes Ultrasound is applied while cooling the vial with ice water so that the temperature of the dispersion does not rise.

The dispersion is transferred to a swing rotor glass tube (50 mL), and centrifuged for 30 minutes under conditions of 58.33 $S^{-1}$ with a centrifuge (H-9R; Kokusan Co., Ltd.). After centrifugation, the glass tube contains silica fine particles with heavy specific gravity in the lower layer. The chloroform solution containing organic silica polymer fine particles in the upper layer is collected, and the chloroform is removed by vacuum drying (40° C./24 hours) to prepare a sample.

Using this sample or the organosilicon polymer fine particles, the abundance ratios of the constituent compounds of the organosilicon polymer fine particle and the ratio of T3 unit structures in the organosilicon polymer fine particle are measured and calculated by solid $^{29}$Si-NMR.

The hydrocarbon group represented by $R^a$ above is confirmed by $^{13}$C-NMR.

$^{13}$C-NMR (Solid) Measurement Conditions

Unit: JNM-ECX500II (JEOL RESONANCE Inc.)

Sample tube: 3.2 mm φ

Sample: sample or the organosilicon polymer fine particles

Measurement temperature: Room temperature

Pulse mode: CP/MAS

Measurement nuclear frequency: 123.25 MHz ($^{13}$C)

Standard substance: Adamantane (external standard: 29.5 ppm)

Sample rotation: 20 kHz

Contact time: 2 ms

Delay time: 2 s

Number of integrations: 1024

In this method, the hydrocarbon group represented by $R^a$ above is confirmed based on the presence or absence of signals attributable to methyl groups (Si—$CH_3$), ethyl groups (Si—$C_2H_5$), propyl groups (Si—$C_3H_7$), butyl groups (Si—$C_4H_9$), pentyl groups (Si—$C_5H_{11}$), hexyl groups (Si—$C_6H_{13}$) or phenyl groups (Si—$C_6H_5$) bound to silicon atoms.

In solid $^{29}$Si-NMR, on the other hand, peaks are detected in different shift regions depending on the structures of the functional groups binding to Si in the constituent compounds of the organosilicon polymer fine particle.

The structures binding to Si can be specified by using standard samples to specify each peak position. The abundance ratio of each constituent compound can also be calculated from the resulting peak areas. The ratio of the peak area of T3 unit structures relative to the total peak area can also be determined by calculation.

The measurement conditions for solid $^{29}$Si-NMR are as follows for example.

Unit: JNM-ECX5002 (JEOL RESONANCE Inc.)
Temperature: Room temperature
Measurement method: DDMAS method, $^{29}$Si 45°
Sample tube: Zirconia 3.2 mm φ
Sample: Packed in sample tube in powder form
Sample rotation: 10 kHz
Relaxation delay: 180 s
Scan: 2000

After this measurement, the peaks of the multiple silane components having different substituents and linking groups in the organosilicon polymer fine particle are separated by curve fitting into the following X1, X2, X3 and X4 structures, and the respective peak areas are calculated.

The X3 structure below is the T3 unit structure.

X1 structure: $(Ri)(Rj)(Rk)SiO_{1/2}$ (A1)

X2 structure: $(Rg)(Rh)Si(O_{1/2})_2$ (A2)

X3 structure: $RmSi(O_{1/2})_3$ (A3)

X4 structure: $Si(O_{1/2})_4$ (A4)

X1:

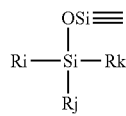

(A1)

X2:

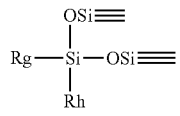

(A2)

X3:

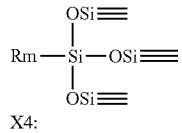

(A3)

X4:

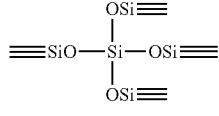

(A4)

Ri, Rj, Rk, Rg, Rh and Rm in formulae (A1), (A2) and (A3) represent halogen atoms, hydroxyl groups, acetoxy groups, alkoxy groups or organic groups such as $C_{1-6}$ hydrocarbon groups bound to silicon.

When a structure needs to be confirmed in more detail, it can be identified from $^1$H-NMR measurement results in addition to the above $^{13}$C-NMR and $^{29}$Si-NMR measurement results.

Method for Identifying Alumina Particle

The alumina particle can be identified by a combination of shape observation by scanning electron microscopy (SEM) and elemental analysis by energy-dispersive X-ray spectroscopy (EDS).

Using an S-4800 (trade name: Hitachi Inc.) scanning electron microscope, the toner is observed in a field enlarged to a magnification of 50,000×. The microscope is focused on the toner particle surface, and the external additive to be identified is observed. The external additive to be identified is analyzed by EDS, and the alumina particle can then be identified based on the presence or absence of an elemental peak.

When an Al elemental peak is observed as an elemental peak, the presence of an alumina particle can be inferred.

A standard sample of the alumina particle that was inferred from EDS analysis is prepared separately and subjected to SEM shape observation and EDS analysis. The particle to be distinguished can then be judged to be an alumina particle or not depending on whether the analysis results for that particle match the analysis results for the standard sample.

Method for Measuring Coverage Ratio of Alumina Particle Surface by Organosilicon Polymer Fine Particle in Composite Particle The "coverage ratio of the surface of the alumina particle with the organosilicon polymer fine particle" in the composite particle is measured using an "5-4800" (trade name) scanning electron microscope (Hitachi, Ltd.). 100 random composite particles are photographed in a field enlarged to a maximum magnification of 50,000×.

In the photographed images, the area "A" of the regions without adhering organosilicon polymer fine particles and the area "B" of the regions with adhering particles in each composite particle are measured, and the ratio of the area covered by the organosilicon polymer fine particle [B/(A+B)] is calculated. The coverage ratio is measured for 100 composite particles, and the arithmetic mean is given as the coverage ratio (area %).

Method for Measuring Number-average Particle Diameters of Primary Particles of Organosilicon Polymer Fine Particle and Alumina Particle This is measured using an "S-4800" (trade name) scanning electron microscope (Hitachi, Ltd.) in combination with elemental analysis by energy dispersive X-ray analysis (EDS). 100 random composite particles are photographed in a field enlarged to a maximum magnification of 50,000×.

100 organosilicon polymer fine particles and alumina particles are selected randomly from the photographed images, the long diameters of the primary particles are measured, and the calculated averages are given as the number-average particle diameters. The observation magnification is adjusted appropriately according to the sizes of the organosilicon polymer fine particle and the alumina particle.

Method for Measuring Circularity of Alumina Particle

To measure the circularity of the alumina particle, an observation image of the alumina particle photographed with a Hitachi S-4800 ultra-high resolution field emission scanning electron microscope (Hitachi High Technologies) is analyzed with ImageJ image analysis software (developed by Wayne Rashand) to calculate the circularity. The measurement procedures are shown below.

(1) Sample Preparation

A conductive paste is thinly spread on a sample stand (15 mm×6 mm aluminum sample stand), and the alumina particle is attached thereto. Excess alumina particles are air blown with a blower, and the particles are thoroughly dried. The sample stand is set in a sample holder.

When measuring a highly aggregating alumina particle, the alumina particle is first mixed with methanol and ultrasound dispersed, and the solvent is removed to obtain the measurement sample.

(2) S-4800 Observation Conditions

The observation conditions are shown below.

| | |
|---|---|
| Acceleration voltage: | 0.8 kV |
| Emission current: | 20 μA |
| Detector: | [SE top (U)], [+BSE (L.A. 100)] |
| Probe current: | [Normal] |
| Focus mode: | [UHR] |
| WD: | [3.0 mm] |

(3) Image Storage

The brightness is adjusted in ABC mode, and a 640×480-pixel image is photographed and stored. The following analysis is performed using this file. The observation magnification is adjusted appropriately according to the size of the fine particle being observed.

(4) Image Analysis

The circularity is calculated from the resulting SEM image using ImageJ image analysis software (developed by Wayne Rashand). The calculation procedures are shown below.

[1] Scale is set with [Analyze]-[Set Scale].
[2] Threshold is set with [Image]-[Adjust]-[Threshold]. (Set to value at which noise is cancelled, leaving the alumina particle to be measured)
[3] Image part of measured alumina particle is selected with [Image]-[Crop].
[4] Overlapping particles are eliminated by image editing.
[5] Black and white image is inverted with [Edit]-[Invert].
[6] [Area], [Shape Descriptors] are checked under [Analyze]-[Set Measurements].
[Redirect to] is set to [None], and [Decimal Place (0-9)] is set to 3.
[7] Analysis is performed with [Analyze]-[Analyze Particle] with particle areas of at least 0.0005 μm$^2$ indicated.
[8] A value is obtained for the circularity of each particle.
[9] Measurement is performed on 100 observed particles, and the arithmetic mean of the observed circularities is calculated and given as the circularity.

The formula for circularity is $4\pi \times (area)/(perimeter^2)$. A circularity value of 1 indicates a perfect circle.

Isolating Alumina Particle from Toner

Circularity may also be measured using an alumina particle that has been isolated from the toner by the following methods.

The toner is ultrasound dispersed in methanol to detach the alumina particle and other external additives in the composite particle, and left standing for 24 hours. The alumina particle and other external additives can be separated from the toner particle by centrifugation, collected, and thoroughly dried to separate the alumina particle from the toner particle.

Measuring Average Projected Area of Composite Particle

To measure the projected area of the composite particle, the toner surface is observed with a scanning electron microscope and measured with image analysis software. Using a Hitachi S-4800 ultra-high resolution field emission scanning electron Microscope (Hitachi High Technologies) as the scanning electron microscope, backscattered electron images taken with the S-4800 are observed. Observation is performed at a magnification of 20000×, an acceleration voltage of 10 kV and a working distance of 3 mm. At a magnification of 20000×, the observation region is about 30 μm×20 μm in size.

A composite particle on the toner surface is captured in an image that can then be binarized with image analysis software to define the contour of the composite particle in the field of view. The projected area of the composite particle can then be calculated by particle analysis of the resulting contour image. ImageJ (developed by Wayne Rasband) is used as the image analysis software.

The projected areas of 100 composite particles present on the toner particle surface are determined by this observation, and the average projected area is calculated by the following formula.

$$(\text{Average projected area}) = (\text{sum of projected areas})/(\text{number of total particles})$$

Method for Measuring Number Ratio of Composite Particles to Toner Particles

The number ratio of the composite particles relative to the toner particles is determined using an S-4800 scanning electron microscope (Hitachi, Inc.) in combination with elemental analysis by energy dispersive X-ray spectroscopy (EDS).

The toner including the composite particle is observed, and images of 100 randomly selected fields are taken at a magnification of 1000. The number of composite particles and the number of toner particles in the toner are counted, and the number ratio is calculated. If the number ratio of the composite particle relative to the toner particle is N, this means that N is the average number of composite particles adhering to each 1 toner particle.

Method for Measuring Average Circularity of Toner

The average circularity of the toner is measured with an "FPIA-3000" flow particle image analyzer (Sysmex Corporation) under the measurement and analysis conditions for calibration operations.

The specific measurement methods are as follows.

About 20 mL of ion-exchange water from which solid impurities and the like have been removed is first placed in a glass container. About 0.2 mL of a dilute solution of "Contaminon N" (a 10 mass % aqueous solution of a pH 7 neutral detergent for washing precision instruments, comprising a nonionic surfactant, an anionic surfactant and an organic builder, manufactured by Wako Pure Chemical Industries, Ltd.) diluted about three times by mass with ion-exchange water is then added as a dispersant.

About 0.02 g of the measurement sample is then added and dispersed for 2 minutes with an ultrasonic disperser to obtain a dispersion for measurement. Cooling is performed as appropriate during this process so that the temperature of the dispersion is 10° C. to 40° C.

Using a tabletop ultrasonic cleaner and disperser having an oscillating frequency of 50 kHz and an electrical output of 150 W (for example, "VS-150" manufactured by Velvo-Clear) as an ultrasonic disperser, a predetermined amount of ion-exchange water is placed on the water tank, and about 2 mL of the Contaminon N is added to the tank.

A flow particle image analyzer equipped with a "LUCPLFLN" objective lens (magnification 20×, aperture 0.40) is used for measurement, with particle sheath "PSE-900A" (Sysmex Corporation) as the sheath liquid. The liquid dispersion obtained by the procedures above is introduced into the flow particle image analyzer, and 2,000 toner particles are measured in HPF measurement mode, total count mode.

The average circularity of the toner is then determined with a binarization threshold of 85% during particle analysis, and with the analyzed particle diameters limited to equivalent circle diameters of from 1.977 to less than 39.54 µm.

Prior to the start of measurement, autofocus adjustment is performed using standard latex particles (for example, Duke Scientific Corporation "RESEARCH AND TEST PARTICLES Latex Microsphere Suspensions 5100A" diluted with ion-exchange water). Autofocus adjustment is then performed again every two hours after the start of measurement.

Method for Measuring Weight-Average Particle Diameter (D4) of Toner

The weight-average particle diameter (D4) of the toner is calculated as follows. A "Multisizer 3 Coulter Counter" precise particle size distribution analyzer (registered trademark, Beckman Coulter, Inc.) based on the pore electrical resistance method and equipped with a 100 µm aperture tube is used as the measurement unit together with the accessory dedicated "Beckman Coulter Multisizer 3 Version 3.51" software (Beckman Coulter, Inc.) for setting the measurement conditions and analyzing the measurement data. Measurement is performed with 25,000 effective measurement channels.

The aqueous electrolytic solution used in measurement may be a solution of special grade sodium chloride dissolved in ion-exchanged water to a concentration of about 1 mass %, such as "ISOTON II" (Beckman Coulter, Inc.) for example.

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained with "Standard particles 10.0 µm" (Beckman Coulter, Inc.). The threshold and noise level are set automatically by pushing the "Threshold/noise level measurement" button. The current is set to 1,600 µA, the gain to 2, and the electrolytic solution to ISOTON II, and a check is entered for "Aperture tube flush after measurement".

On the "Conversion settings from pulse to particle diameter" screen of the dedicated software, the bin interval is set to the logarithmic particle diameter, the particle diameter bins to 256, and the particle diameter range to 2 to 60 µm.

The specific measurement methods are as follows.

(1) About 200 mL of the aqueous electrolytic solution is placed in a glass 250 mL round-bottomed beaker dedicated to the Multisizer 3, the beaker is set on the sample stand, and stirring is performed with a stirrer rod counter-clockwise at a rate of 24 rps. Contamination and bubbles in the aperture tube are then removed by the "Aperture tube flush" function of the dedicated software.

(2) 30 mL of the same aqueous electrolytic solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries, Ltd.) diluted about three times by mass with ion-exchange water is added.

(3) An ultrasonic disperser "Ultrasonic Dispersion System Tetra150" (Nikkaki Bios Co., Ltd.) with an electrical output of 120 W equipped with two built-in oscillators having an oscillating frequency of 50 kHz with their phases shifted by 180° from each other is prepared. About 3.3 L of ion-exchange water is added to the water tank of the ultrasonic disperser, and about 2 mL of Contaminon N is added to the tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolytic solution in the beaker.

(5) The aqueous electrolytic solution in the beaker of (4) above is exposed to ultrasound as about 10 mg of toner is added bit by bit to the aqueous electrolytic solution, and dispersed. Ultrasound dispersion is then continued for a further 60 seconds. During ultrasound dispersion, the water temperature in the tank is adjusted appropriately to from 10° C. to 40° C.

(6) The aqueous electrolytic solution of (5) above with the toner dispersed therein is dripped with a pipette into the round-bottomed beaker of (1) above set on the sample stand, and adjusted to a measurement concentration of about 5%. Measurement is then performed until the number of measured particles reaches 50,000.

(7) The measurement data is analyzed with the dedicated software included with the apparatus, and the weight-average particle diameter (D4) is calculated. The weight-average particle diameter (D4) is the "Average diameter" on the "Analysis/volume statistical value (arithmetic mean)" screen when graph/volume % is set in the dedicated software.

Measuring Glass Transition Point (Tg) of Toner

The Tg of the toner is measured as follows by differential scanning calorimetry (DSC). Measurement is performed in accordance with ASTM D3418-82 using a Q2000 differential scanning calorimeter (TA Instruments). The melting points of indium and zinc are used for temperature correction of the device detection part, and the heat of fusion of indium is used to correct the calorific value.

Specifically, 3 mg of the specimen toner is weighed precisely, placed in an aluminum pan, and measured under the following conditions using an empty aluminum pan for reference, and the glass transition point is determined by the midpoint method from the DSC curve during the first temperature rise.

Measurement Conditions

Equilibrium maintained for 5 minutes at 20° C.

1.0° C./min modulation applied, temperature raised at 1° C./min to 140° C.

Equilibrium maintained for 5 minutes at 140° C.

Temperature lowered to 20° C.

EXAMPLES

The invention is explained in more detail below based on examples and comparative examples, but the invention is in no way limited to these. Unless otherwise specified, parts in the examples are based on mass.

Toner manufacturing examples are explained.

Preparation of Binder Resin Particle Dispersion 89.5 parts of styrene, 9.2 parts of butyl acrylate, 1.3 parts of acrylic acid and 3.2 parts of n-lauryl mercaptane were mixed and dissolved. An aqueous solution of 1.5 parts of Neogen RK (DKS Co., Ltd.) in 150 parts of ion-exchange water was added and dispersed in this mixed solution.

This was then gently stirred for 10 minutes as an aqueous solution of 0.3 parts of potassium persulfate mixed with 10 parts of ion-exchange water was added.

After nitrogen purging, emulsion polymerization was performed for 6 hours at 70° C. After completion of polymerization, the reaction solution was cooled to room temperature, and ion-exchange water was added to obtain a binder resin particle dispersion with a volume-based median particle diameter of 0.2 μm and a solids concentration of 12.5 mass %.

Preparation of Release Agent Dispersion 100 parts of a release agent (behenyl behenate, melting point: 72.1° C.) and 15 parts of Neogen RK were mixed with 385 parts of ion-exchange water, and dispersed for about 1 hour with a JN100 wet jet mill (Jokoh Co., Ltd.) to obtain a release agent dispersion. The solids concentration of the release agent dispersion was 20 mass %.

Preparation of Colorant Dispersion 100 parts of carbon black "Nipex35 (Orion Engineered Carbons)" and 15 parts of Neogen RK were mixed with 885 parts of ion-exchange water, and dispersed for about 1 hour in a JN100 wet jet mill to obtain a colorant dispersion.

Preparation of Toner Particle 1

265 parts of the binder resin particle dispersion, 10 parts of the release agent dispersion and 10 parts of the colorant dispersion were dispersed with a homogenizer (IKA Japan K.K.: Ultra-Turrax T50).

The temperature inside the vessel was adjusted to 30° C. under stirring, and 1 mol/L hydrochloric acid was added to adjust the pH to 5.0. This was left for 3 minutes before initiating temperature rise, and the temperature was raised to 50° C. to produce aggregate particles. The particle diameter of the aggregate particles was measured under these conditions with a "Multisizer 3 Coulter Counter" (registered trademark, Beckman Coulter, Inc.). Once the weight-average particle diameter reached 6.2 μm, 1 mol/L sodium hydroxide aqueous solution was added to adjust the pH to 8.0 and arrest particle growth.

The temperature was then raised to 95° C. to fuse and spheroidize the aggregate particles. Temperature lowering was initiated when the average circularity reached 0.980, and the temperature was lowered to 30° C. to obtain a toner particle dispersion 1.

Hydrochloric acid was added to adjust the pH of the resulting toner particle dispersion 1 to 1.5 or less, and the dispersion was stirred for 1 hour, left standing, and then subjected to solid-liquid separation in a pressure filter to obtain a toner cake.

This was made into a slurry with ion-exchange water, re-dispersed, and subjected to solid-liquid separation in the previous filter unit. Re-slurrying and solid-liquid separation were repeated until the electrical conductivity of the filtrate was not more than 5.0 μS/cm, to perform final solid-liquid separation and obtain a toner cake.

The resulting toner cake was dried with a Flash Jet air dryer (Seishin Enterprise Co., Ltd.). The drying conditions were a blowing temperature of 90° C. and a dryer outlet temperature of 40° C., with the toner cake supply speed adjusted according to the moisture content of the toner cake so that the outlet temperature did not deviate from 40° C. Fine and coarse powder was cut with a multi-division classifier using the Coanda effect, to obtain a toner particle 1. The toner particle 1 had a weight-average particle diameter (D4) of 6.3 μm, an average circularity of 0.980, and a glass transition temperature (Tg) of 57° C.

Manufacturing Example of Organosilicon Polymer Fine Particle A1

Step 1

360.0 parts of water were placed in a reactor equipped with a thermometer and a stirrer, and 15.0 parts of 5.0 mass % hydrochloric acid were added to obtain a uniform solution. This was stirred at 25° C. as 136.0 parts of methyl trimethoxysilane were added and stirred for 5 hours, after which the mixture was filtered to obtain a clear reaction solution containing a silanol compound or a partial condensate thereof Step 2

440.0 parts of water were placed in a reactor equipped with a thermometer, a stirrer and a dripping mechanism, and 15.0 parts of 10.0 mass % ammonia water were added to obtain a uniform solution.

This was stirred at 40° C. as 100.0 parts of the reaction solution obtained in Step 1 were dripped in over the course of 1.00 hours, and then stirred for 6 hours to obtain a suspension.

The resulting suspension was centrifuged to precipitate the particles, which were then removed and dried for 24 hours in a drier at 200° C. to obtain an organosilicon polymer fine particle A1.

The number-average particle diameter of the primary particles of the resulting organosilicon polymer fine particle A1 was 50 nm.

Manufacturing Examples of Organosilicon Polymer Fine Particles A2 to A6

Organosilicon polymer fine particles A2 to A6 were obtained as in the manufacturing example of the organosilicon polymer fine particle A1 except that the silane compound, reaction initiation temperature, added amount of ammonia water and reaction solution dripping time were changed as shown in Tables 1-1 and 1-2. The physical properties of the resulting organosilicon polymer fine particles A2 to A6 are shown in Tables 1-1 and 1-2.

TABLE 1-1

| Organosilicon polymer fine particle No. | First Step | | | | | | | | |
|---|---|---|---|---|---|---|---|---|---|
| | Water | Hydrochloric acid | Reaction temperature | Silane compound A | | Silane compound B | | Silane compound C | |
| | Parts | Parts | ° C. | Name | Parts | Name | Parts | Name | Parts |
| A1 | 360.0 | 15.0 | 25 | Methyl trimethoxysilane | 136.0 | — | — | — | — |
| A2 | 360.0 | 8.0 | 25 | Pentyl trimethoxysilane | 190.1 | Tripentyl methoxysilane | 5.0 | — | — |
| A3 | 360.0 | 23.0 | 25 | Methyl trimethoxysilane | 136.0 | — | — | — | — |
| A4 | 360.0 | 15.0 | 25 | Methyl trimethoxysilane | 122.4 | Trimethyl methoxysilane | 10.4 | — | — |

TABLE 1-1-continued

| | | | | First Step | | | | | |
|---|---|---|---|---|---|---|---|---|---|
| Organosilicon polymer fine particle No. | Water Parts | Hydrochloric acid Parts | Reaction temperature °C. | Silane compound A Name | Parts | Silane compound B Name | Parts | Silane compound C Name | Parts |
| A5 | 360.0 | 13.0 | 25 | Methyl trimethoxysilane | 122.4 | Trimethyl methoxysilane | 10.4 | Tetramethoxysilane | 7.6 |
| A6 | 360.0 | 20.0 | 25 | Methyl trimethoxysilane | 136.0 | — | — | — | — |

TABLE 1-2

| Organosilicon polymer fine particle No. | Second Step | | | | | Number-average particle diameter of primary particles [nm] | T |
|---|---|---|---|---|---|---|---|
| | Reaction solution obtained in first step Parts | Water Parts | Ammonia water Parts | Reaction start temperature °C. | Dripping time h | | |
| A1 | 100 | 440 | 15.0 | 40 | 1.00 | 50 | 1.00 |
| A2 | 100 | 440 | 10.0 | 40 | 2.00 | 20 | 0.98 |
| A3 | 100 | 440 | 17.0 | 35 | 0.60 | 90 | 1.00 |
| A4 | 100 | 440 | 15.0 | 40 | 1.00 | 50 | 0.90 |
| A5 | 100 | 440 | 15.0 | 40 | 1.00 | 50 | 0.88 |
| A6 | 100 | 500 | 23.0 | 30 | 0.17 | 350 | 1.00 |

In the Tables 1-1 and 1-2, T represents the ratio of the area of peaks derived from silicon having a T3 unit structure to the total area of peaks derived from all silicon element contained in the organosilicon polymer fine particles.

Examples of Alumina Particle

The alumina particle is explained.

The alumina particles shown in Table 2 were used. The physical properties of the alumina particles 1 to 10 are shown in Table 2. The alumina particles 4 to 6 were prepared by the following manufacturing methods.

The surfaces of the alumina particles 1 to 5 and 7 to 10 are untreated. The surface of the alumina particle 6 has been treated with calcium stearate.

Manufacturing Example of Alumina Particle 4

An alumina particle 2 with a number-average particle diameter of 150 nm (AKP-53, Sumitomo Chemical Co., Ltd.) was dispersed in a solution, centrifuged to remove coarse particles, and then dried to obtain an alumina particle 4 with a number-average particle diameter of 100 nm. The physical properties of the alumina particle 4 are shown in Table 2.

Manufacturing Example of Alumina Particle 5

An air classifier was used to remove fine particles from an alumina particle 3 with a number-average particle diameter of 590 nm (AA-07, Sumitomo Chemical Co., Ltd.) and obtain an alumina particle 5 with a number-average particle diameter of 950 nm. The physical properties of the alumina particle 5 are shown in Table 2.

Manufacturing Example of Alumina Particle 6

An alumina particle with a number-average particle diameter of 240 nm (AES-11, Sumitomo Chemical Co., Ltd.) was surface treated with 0.5 mass % calcium stearate to obtain an alumina particle 6.

The physical properties of the alumina particle 6 are shown in Table 2.

TABLE 2

| Alumina particle No. | Product name (manufacturer) | Surface treatment | Number-average diameter of primary particles (nm) | Circularity |
|---|---|---|---|---|
| 1 | AA-04 (Sumitomo Chemical Co., Ltd.) | — | 400 | 0.79 |
| 2 | AKP-53 (Sumitomo Chemical Co., Ltd.) | — | 150 | 0.76 |
| 3 | AA-07 (Sumitomo Chemical Co., Ltd.) | — | 590 | 0.79 |
| 4 | Centrifuged alumina particle 2 | — | 100 | 0.82 |
| 5 | Air-classified alumina particle 3 | — | 950 | 0.75 |
| 6 | AES-11 (Sumitomo Chemical Co., Ltd.) | Calcium stearate | 240 | 0.65 |
| 7 | TM5D (Taimei Chemicals Co., Ltd.) | — | 230 | 0.98 |

TABLE 2-continued

| Alumina particle No. | Product name (manufacturer) | Surface treatment | Number-average diameter of primary particles (nm) | Circularity |
|---|---|---|---|---|
| 8 | AO-509 (Admatechs Co.) | — | 800 | 0.98 |
| 9 | Alu-C (Nippon Aerosil Co., Ltd.) | — | 15 | 0.72 |
| 10 | AA-15 (Sumitomo Chemical Co., Ltd.) | — | 1400 | 0.78 |

Manufacturing Example of Composite Particle 1

The organosilicon polymer fine particle A1 and the alumina particle 1 were mixed in a 500 ml glass vessel in the proportions shown in Table 3, and then mixed for 1 minute with a blender-mixer (Oster Co.) at an output of 450 W to obtain a composite particle 1.

Manufacturing Examples of Composite Particles 2 to 19

Composite particles 2 to 19 were obtained as in the manufacturing example of the composite particle 1 except that the conditions were changed as shown in Table 3.

Manufacturing Example of Composite Particle 20

A composite particle 20 was obtained as in the manufacturing example of the composite particle 1 except that 8 parts of a sol-gel silica with a number-average particle diameter of 110 nm (X24-9600A, Shinetsu Chemical Co., Ltd.) were used instead of the 3.5 parts of the organosilicon polymer fine particle A1.

TABLE 3

| Composite particle No. | Organosilicon polymer fine particle | | | Alumina particle | | |
|---|---|---|---|---|---|---|
| | No. | Particle diameter (nm) | Parts | No. | Particle diameter (nm) | Parts |
| 1 | A1 | 50 | 3.5 | 1 | 400 | 1.0 |
| 2 | A1 | 50 | 5.0 | 1 | 400 | 1.0 |
| 3 | A3 | 90 | 7.0 | 2 | 150 | 1.0 |
| 4 | A3 | 90 | 10.0 | 2 | 150 | 1.0 |
| 5 | A3 | 90 | 12.0 | 2 | 150 | 1.0 |
| 6 | A2 | 20 | 0.05 | 3 | 590 | 1.0 |
| 7 | A2 | 20 | 0.1 | 3 | 590 | 1.0 |
| 8 | A2 | 20 | 0.7 | 3 | 590 | 1.0 |
| 9 | A4 | 50 | 3.5 | 1 | 400 | 1.0 |
| 10 | A5 | 50 | 3.5 | 1 | 400 | 1.0 |
| 11 | A1 | 50 | 12.0 | 4 | 100 | 1.0 |
| 12 | A1 | 50 | 0.6 | 5 | 950 | 1.0 |
| 13 | A1 | 50 | 2.5 | 6 | 240 | 1.0 |
| 14 | A1 | 50 | 2.5 | 7 | 230 | 1.0 |
| 15 | A1 | 50 | 0.8 | 8 | 800 | 1.0 |
| 16 | A1 | 20 | 0.8 | 1 | 400 | 1.0 |
| 17 | A3 | 90 | 100.0 | 9 | 15 | 1.0 |
| 18 | A3 | 90 | 1.0 | 10 | 1400 | 1.0 |
| 19 | A6 | 350 | 3.0 | 3 | 590 | 1.0 |

Manufacturing Example of Toner 1

External Addition Step 0.30 parts of the composite particle 1 and 1.00 part of a hydrophobic silica fine particle [shown as C1 in the table, BET specific surface area 300 m$^2$/g, hydrophobically treated with 30 parts of hexamethyl disilazane (HMDS) and 10 parts of dimethyl silicone oil per 100 parts of the silica fine particle) were added to 100.00 parts of the resulting toner particle 1 in an FM mixer (FM10C, Nippon Coke and Engineering Co., Ltd.) with 7° C. water flowing through the jacket.

Once the water temperature in the jacket had stabilized at 7° C.±1° C., this was mixed for 5 minutes with the peripheral speed of the rotating blade at 38 m/sec to obtain a toner mixture 1. The amount of water flowing through the jacket was adjusted appropriately during this process so that the internal tank temperature of the FM mixer did not exceed 25° C. The resulting toner mixture 1 was sieved with a 75 μm mesh to obtain a toner 1.

The toner manufacturing conditions and the physical properties of the toner are shown in Table 4. The coverage ratio of the surface of the alumina particle with the organosilicon polymer fine particle in the composite particle, the average projected area of the composite particle and the number ratio of composite particles relative to toner particles were also measured in the resulting toner. The results are shown in Table 4.

Preparation Examples of Toners 2 to 19 and Comparative Toners 1 to 7

Toners 2 to 19 and comparative toners 1 to 7 were obtained as in the manufacturing example of the toner 1 except that the conditions were changed as shown in Table 4. The physical properties of the toners 2 to 19 and comparative toners 1 to 7 are shown in Table 4.

TABLE 4

| Example No. | Toner No. | External addition conditions | | | | | | Physical properties of composite particle | | |
|---|---|---|---|---|---|---|---|---|---|---|
| | | Additive 1 | Parts | Additive 2 | Parts | Additive 3 | Parts | X (area %) | Y (μm$^2$) | Z |
| 1 | 1 | Composite particle 1 | 0.30 | C1 | 1.00 | — | — | 32 | 0.30 | 2 |
| 2 | 2 | Composite particle 2 | 0.30 | C1 | 1.00 | — | — | 50 | 0.32 | 2 |

TABLE 4-continued

|  |  | External addition conditions | | | | | | Physical properties of composite particle | | |
| --- | --- | --- | --- | --- | --- | --- | --- | --- | --- | --- |
| Example No. | Toner No. | Additive 1 | Parts | Additive 2 | Parts | Additive 3 | Parts | X (area %) | Y ($\mu m^2$) | Z |
| 3 | 3 | Composite particle 3 | 0.30 | C1 | 1.00 | — | — | 25 | 0.10 | 12 |
| 4 | 4 | Composite particle 4 | 0.30 | C1 | 1.00 | — | — | 34 | 0.10 | 11 |
| 5 | 5 | Composite particle 5 | 0.30 | C1 | 1.00 | — | — | 44 | 0.12 | 11 |
| 6 | 6 | Composite particle 6 | 0.30 | C1 | 1.00 | — | — | 2 | 0.45 | 0.4 |
| 7 | 7 | Composite particle 7 | 0.30 | C1 | 1.00 | — | — | 5 | 0.43 | 0.5 |
| 8 | 8 | Composite particle 8 | 0.30 | C1 | 1.00 | — | — | 45 | 0.48 | 0.4 |
| 9 | 9 | Composite particle 9 | 0.30 | C1 | 1.00 | — | — | 32 | 0.32 | 2 |
| 10 | 10 | Composite particle 10 | 0.30 | C1 | 1.00 | — | — | 34 | 0.30 | 2 |
| 11 | 11 | Composite particle 11 | 0.30 | C1 | 1.00 | — | — | 34 | 0.05 | 50 |
| 12 | 12 | Composite particle 12 | 0.30 | C1 | 1.00 | — | — | 28 | 0.62 | 0.2 |
| 13 | 13 | Composite particle 13 | 0.30 | C1 | 1.00 | — | — | 20 | 0.15 | 5 |
| 14 | 14 | Composite particle 14 | 0.30 | C1 | 1.00 | — | — | 20 | 0.18 | 4 |
| 15 | 15 | Composite particle 15 | 0.30 | C1 | 1.00 | — | — | 24 | 0.60 | 0.3 |
| 16 | 16 | Composite particle 1 | 0.10 | C1 | 1.00 | — | — | 35 | 0.30 | 0.9 |
| 17 | 17 | Composite particle 1 | 0.30 | C1 | 1.00 | — | — | 35 | 0.30 | 3 |
| 18 | 18 | Composite particle 1 | 0.50 | C1 | 1.00 | — | — | 35 | 0.30 | 4 |
| 19 | 19 | Composite particle 1 | 0.70 | C1 | 1.00 | — | — | 35 | 0.30 | 6 |
| C.E. 1 | C. 1 | Composite particle 16 | 0.30 | C1 | 1.00 | — | — | 58 | 0.32 | 0.8 |
| C.E. 2 | C. 2 | Composite particle 17 | 0.30 | C1 | 1.00 | — | — | 88 | 0.08 | 50 |
| C.E. 3 | C. 3 | Composite particle 18 | 0.30 | C1 | 1.00 | — | — | 35 | 0.80 | 0.1 |
| C.E. 4 | C. 4 | Composite particle 19 | 0.30 | C1 | 1.00 | — | — | 26 | 0.42 | 0.5 |
| C.E. 5 | C. 5 | Composite particle 20 | 0.30 | C1 | 1.00 | — | — | 32 | 0.16 | 5 |
| C.E. 6 | C. 6 | Alumina particle 1 | 0.30 | C1 | 1.00 | — | — | — | — | — |
| C.E. 7 | C. 7 | Alumina particle 2 | 0.30 | A3 | 0.3 | C1 | 1.00 | 0 | — | 0 |

In the table, "C.E." represents "Comparative Example", "C." represents "Comparative", X represents the coverage ratio (area %) of the alumina particle surface by the organosilicon polymer fine particle, Y represents the average projected area of the composite particle, Z represents the number ratio of composite particles relative to toner particles, and A3 is the organosilicon polymer fine particle A3.

Example 1

The toner 1 was evaluated as follows. The evaluation results are shown in Table 5.

A modified LBP 712Ci (Canon) was used as the apparatus for evaluation. The process speed of the main unit was modified to 300 mm/sec. Under these conditions, the necessary adjustments were made to make image formation possible. The toner was also removed from the black cartridge, which was then filled with 200 g of the toner 1.

Image Evaluation
(1) Fogging on Drum

To test the charging stability of the toner, fogging (HH fogging) in a high-temperature high-humidity environment (30° C./80% RH) and fogging (LL fogging) in a low-temperature low-humidity environment (15° C./10% RH) were evaluated by the following methods.

2,000 sheets per day of an image with a print percentage of 1.0% were output on Canon color laser copy paper (A4: 81.4 g/m², also used below unless otherwise specified) in each environment with a pause of 2 seconds after every 2 sheets, for a total of 20,000 sheets. Fogging on the drum in the cartridge was collected by taping and evaluated at the beginning, after 10,000 sheets and after 20,000 sheets of output.

Fogging was measured with a reflection densitometer (Tokyo Denshoku, Reflectometer Model TC-6DS). The worst value of the white background reflection of the taped part was given as Ds and the average value of the reflection density of the taped part of the paper was given as Dr, and (Ds−Dr) was given as the fogging density (%). A green filter was used as the filter. Evaluation was performed using the following evaluation standard. In this evaluation method, fogging density on the drum increases as the charging performance of the toner declines.

Fogging
Evaluation Standard
A: Fogging density less than 0.5%
B: Fogging density at least 0.5% to less than 2.0%
C: Fogging density at least 2.0% to less than 4.0%
D: Fogging density at least 4.0%

(2) Solid Image Followability

To test the flowability and durability of the toner, solid image followability was evaluated in a high-temperature high-humidity environment (30° C./80% RH, HH). 2,000 sheets per day of an image with a print percentage of 1.0% were output on Canon color laser copy paper in a high-temperature high-humidity environment (30° C./80% RH) with a pause of 2 seconds after every 2 sheets, for a total of 20,000 sheets.

Three sheets of an all-solid image were output continuously as sample images using the cartridge at the beginning, after 10,000 sheets and after 20,000 sheets of output. The resulting three all-solid images were evaluated visually for solid image followability. This evaluation yields better results the greater the flowability of the toner.

Solid Image Followability
Evaluation Standard
A: Image density uniform without irregularities
B: Some irregularities in image density
C: Image density with irregularities but still good
D: Image density with irregularities, uniform solid image not obtained (3) LL Charging Roller Contamination To test the degree of wear and contamination of the key parts by the toner, charging roller contamination was evaluated by the following method. 2,000 sheets per day of an image with a print percentage of 1.0% were output on Canon color laser copy paper in a low-temperature low-humidity environment (15° C./10% RH, LL) with a pause of 2 seconds after every 2 sheets, for a total of 20,000 sheets of output.

The charging roller was then removed from the toner cartridge, the charging roller was removed from a new (commercial) process cartridge and replaced with the above charging roller after 20,000 sheets of output, and a halftone image was output. The uniformity of the halftone image was evaluated visually to evaluate charging roller contamination. Because charging roller contamination is likely when there is wear to the photosensitive body or the cleaning blade, this evaluation is lower the greater the degree of wear and contamination of the key parts by the toner.

Charging Member Contamination
  Evaluation Standard
  A: Image density uniform with no irregularities
  B: Some irregularities in image density
  C: Image density with irregularities but still good
  D: Image density with irregularities, uniform solid image not obtained Examples 2 to 19, Comparative Examples 1 to 7

The same evaluations in Example 1 were performed using the toners 2 to 19 and the comparative toners 1 to 7. The evaluation results are shown in Table 5.

TABLE 5

| Example | Toner No. | HH fogging Initial | | HH fogging After 10000 sheets | | HH fogging After 20000 sheets | | LL fogging Initial | | LL fogging After 10000 sheets | | LL fogging After 20000 sheets | | HH solid image followability Initial | HH solid image followability After 10000 sheets | HH solid image followability After 20000 sheets | LL charging roller contamination After 20000 sheets |
|---|---|---|---|---|---|---|---|---|---|---|---|---|---|---|---|---|---|
| 1 | 1 | 0.3 | A | 0.4 | A | 0.3 | A | 0.3 | A | 0.3 | A | 0.3 | A | A | A | A | A |
| 2 | 2 | 0.3 | A | 0.3 | A | 0.8 | B | 0.3 | A | 0.3 | A | 0.4 | A | A | A | A | A |
| 3 | 3 | 0.3 | A | 0.3 | A | 0.3 | A | 0.3 | A | 0.3 | A | 0.3 | A | A | A | A | B |
| 4 | 4 | 0.3 | A | 0.4 | A | 0.3 | A | 0.3 | A | 0.3 | A | 0.3 | A | A | A | A | B |
| 5 | 5 | 0.3 | A | 0.4 | A | 0.4 | A | 0.3 | A | 0.3 | A | 0.4 | A | A | A | A | B |
| 6 | 6 | 0.3 | A | 0.3 | A | 0.3 | A | 0.3 | A | 0.3 | A | 1.2 | B | A | A | B | A |
| 7 | 7 | 0.4 | A | 0.3 | A | 0.4 | A | 0.4 | A | 0.3 | A | 0.3 | A | A | A | A | A |
| 8 | 8 | 0.3 | A | 0.4 | A | 0.3 | A | 0.3 | A | 0.4 | A | 0.4 | A | A | A | A | A |
| 9 | 9 | 0.3 | A | 0.3 | A | 0.4 | A | 0.3 | A | 1.3 | B | 2.3 | C | A | B | C | A |
| 10 | 10 | 0.4 | A | 0.3 | A | 0.3 | A | 0.3 | A | 1.5 | B | 2.5 | C | A | B | C | A |
| 11 | 11 | 0.3 | A | 0.7 | B | 0.9 | B | 0.3 | A | 1.2 | B | 1.7 | B | A | A | A | A |
| 12 | 12 | 0.3 | A | 0.3 | A | 0.3 | A | 0.4 | A | 0.3 | A | 0.3 | A | A | B | B | B |
| 13 | 13 | 0.3 | A | 0.3 | A | 0.4 | A | 0.3 | A | 0.3 | A | 0.3 | A | A | B | C | A |
| 14 | 14 | 0.4 | A | 0.4 | A | 0.4 | A | 0.3 | A | 0.3 | A | 0.3 | A | A | A | A | C |
| 15 | 15 | 0.4 | A | 0.3 | A | 0.3 | A | 0.3 | A | 0.3 | A | 0.3 | A | A | A | A | C |
| 16 | 16 | 0.3 | A | 0.3 | A | 0.3 | A | 0.3 | A | 0.3 | A | 0.3 | A | A | A | A | A |
| 17 | 17 | 0.3 | A | 0.4 | A | 0.4 | A | 0.3 | A | 0.4 | A | 0.3 | A | A | A | A | A |
| 18 | 18 | 0.3 | A | 0.4 | A | 0.3 | A | 0.3 | A | 0.4 | A | 0.3 | A | A | A | B | B |
| 19 | 19 | 0.3 | A | 0.4 | A | 0.3 | A | 0.3 | A | 0.3 | A | 0.3 | A | A | A | B | C |
| C.E. 1 | C. 1 | 0.3 | A | 2.2 | C | 4.3 | D | 0.3 | A | 3.1 | C | 5.3 | D | A | A | A | A |
| C.E. 2 | C. 2 | 0.3 | A | 3.2 | C | 6.1 | D | 0.3 | A | 2.8 | C | 4.2 | D | A | A | A | D |
| C.E. 3 | C. 3 | 0.3 | A | 0.3 | A | 0.4 | A | 0.3 | A | 0.3 | A | 0.3 | A | A | C | D | D |
| C.E. 4 | C. 4 | 0.3 | A | 0.6 | B | 3.9 | C | 0.4 | A | 1.1 | B | 2.8 | C | A | C | C | D |
| C.E. 5 | C. 5 | 0.3 | A | 2.5 | C | 3.4 | C | 0.3 | A | 1.6 | B | 3.1 | C | A | B | C | D |
| C.E. 6 | C. 6 | 0.3 | A | 0.3 | A | 0.4 | A | 0.3 | A | 0.4 | A | 0.3 | A | A | C | D | D |
| C.E. 7 | C. 7 | 0.3 | A | 0.4 | A | 0.3 | A | 0.3 | A | 0.4 | A | 0.3 | A | A | C | D | D |

In the table, "C.E." represents "Comparative Example", "C." represents "Comparative".

Good results were obtained for Examples 1 to 19 in all evaluation items. However, poor results were obtained for Comparative Examples 1 to 7 in some evaluation items. These results show that the present disclosure can provide a toner having excellent flowability and charging stability during long-term durable use with little wear or contamination to the key parts of the image-forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-107074, filed Jun. 22, 2020, which is hereby incorporated by reference herein in its entirety.

What is claimed is:

1. A toner comprising a toner particle and an external additive, wherein
    the external additive comprises a composite particle comprising an organosilicon polymer fine particle covering a surface of an alumina particle,
    a coverage ratio of the surface of the alumina particle with the organosilicon polymer fine particle is 1 to 50 area %, and
    given A (nm) as a number-average particle diameter of primary particles of the organosilicon polymer fine particle and B (nm) as a number-average particle diameter of primary particles of the alumina particle, following formulae (I) and (II) are satisfied:

$$A \leq 90 \quad (I)$$

$$100 \leq B \leq 1000 \quad (II).$$

2. The toner according to claim 1, wherein
    the organosilicon polymer fine particle has a structure of alternately binding silicon atoms and oxygen atoms, and at least part of an organosilicon polymer in the organosilicon polymer fine particle comprises a T3 unit structure represented by $R^a SiO_{3/2}$, where $R^a$ is a $C_{1-6}$ alkyl group or a phenyl group.

3. The toner according to claim 2, wherein in $^{29}$Si-NMR measurement of the organosilicon polymer fine particle, a ratio of an area of peaks derived from silicon having the T3 unit structure relative to a total area of peaks derived from all silicon element contained in the organosilicon polymer fine particle is 0.50 to 1.00.

4. The toner according to claim 1, wherein the alumina particle has a circularity of 0.70 to 0.99.

5. The toner according to claim 1, wherein an average projected area of the composite particle is 0.01 to 1.00 μm².

6. The toner according to claim 1, wherein a number ratio of the composite particle relative to the toner particle is at least 0.1.

7. The toner according to claim 1, wherein the content of the composite particle is from 0.01 to 3.00 mass parts per 100 mass parts of the toner particle.

* * * * *